Aug. 12, 1969
MAMORU OGIHARA
3,460,450
AUTOMATIC EXPOSURE CONTROL CAMERA
Filed Oct. 26, 1965
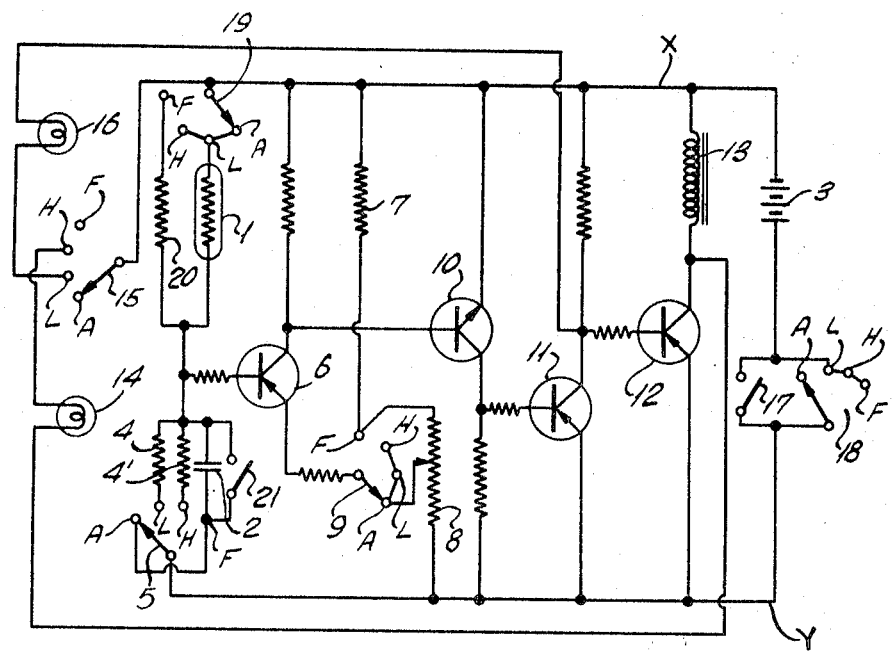
INVENTOR.
MAMORU OGIHARA
BY Stanley Wolder
ATTORNEY

United States Patent Office 3,460,450
Patented Aug. 12, 1969

3,460,450
AUTOMATIC EXPOSURE CONTROL CAMERA
Mamoru Ogihara, Shimosuwa-machi, Suwa-gun, Japan, assignor to Kabushiki Kaisha Yashica, Shibuya-ku, Tokyo-to, Japan, a corporation of Japan
Filed Oct. 26, 1965, Ser. No. 505,287
Claims priority, application Japan, Oct. 27, 1964, 39/83,553
Int. Cl. G01j 1/00, 1/46
U.S. Cl. 95—10                                11 Claims The present invention relates generally to improvements in cameras and it relates more particularly to an improved automatic exposure camera of the type having a solenoid controlled shutter in which signalling means are provided for furnishing an indication of the suitability of the light conditions for effecting satisfactory photographic operation as related to the manipulation and operating limits and parameters of the camera and the film.

It is well known that for any particular camera there are some functional limiting points which determine the proper photographic exposure time. The factors for determining the proper exposure value or time are the sensitivity or speed of the light sensitive material or film used, the diaphragm value or aperture and the shutter speed (the frame speed in cinematographic cameras). The limiting point for a lowly illuminated object is the combination of the largest diaphragm aperture and the longest exposure time which are proper to the particular camera, and the limiting point for highly illuminated object is the combination of the smallest diaphragm value and the shortest exposure time which are proper to the particular camera. For objects of excessively high or excessively low illumination which exceed the respective limits corresponding to the above mentioned limiting points respectively, it is desirable in manually as well as automatic exposure controlled cameras that the limiting points be indicated to the user prior to the photographing operation by means of some signal or alarm device. It will contribute to preventing failures in actual photographing operations to automatically present a suitable indication or to automatically control the photographing operation at some particular exposure time point, for example 1/30 sec. which is generally admitted to be the limit of no shaking effect on the camera held by hands, the exposure time being automatically controlled with such exposure time point as limiting point.

In hitherto widely used conventional automatically controlled cameras in which the diaphragm aperture is directly or indirectly controlled by the action of an indicating instrument responsive to a photoelectric current or an electric current flowing through a photoconductor, signal or alarm devices indicating said upper and lower exposure limits, various kinds of which devices have been proposed and employed, are associated with the action of the indicating instrument and are accordingly responsive to the photoelectric current or electric current flowing through photoconductor. However, with the recent introduction into practical use of electric control of the shutter function in response to actual exposure aperture value and exposure time by mutually controlling the exposure time and diaphragm aperture by means of, for example, an electro-magnetic shutter, the utility of the conventional signal mechanism above mentioned has been greatly diminished. The signal operation associated with the indicating instrument action has the disadvantage that the limit of the hand-held camera photographing operation and the like cannot be directly indicated by the action of the indicating instrument.

In automatic exposure time control devices, it is of great advantage that the photographing limits of the camera according to the function thereof and the properness of the automatically set condition be clearly indicated, and further greater advantage is achieved by so arranging the device as to be able to indicate the hand-held camera photographing limit in view of the fact that the electro-magnetic shutter controls the exposure time.

It is therefore a principal object of the present invention to provide an improved automatic exposure camera.

Another object of the present invention is to provide an improved automatic exposure camera having signalling means which furnish an indication of the suitability of the object lighting conditions as related to the operating limits of the camera and film.

Still another object of the present invention is to provide an improved camera having an automatic solenoid controlled shutter in which means are provided for furnishing a signal as to the operational limits of the camera and film and the specific handling of the camera.

A further object of the present invention is to provide an improved automatic exposure camera of the above nature characterized by its reliability, ease of use, versatility and adaptability.

The above and other objects of the present invention will become apparent from a reading of the following description taken in conjunction with the accompanying drawing which is a circuit diagram of a preferred embodiment of the present invention.

The present invention contemplates the provision of an automatic exposure time-controlling device of such arrangement that with an electromagnetic shutter it is possible to indicate the photographing limits as determined by the function of the particular camera to which the device is attached, the limits of automatic controlling operation and also of the limit of hand-held camera photographing.

In the device according to the present invention, an electromagnetic shutter is provided which is actuated with a time constant determined by the time required for voltage rise between the terminals of a capacitor which is connected in series with a photoconductor which varies its resistance value in response to the object brightness, the photoconductor and the capacitor constituting a photoconductive electric circuit connected across a voltage source; electric current restricting resistors are so provided in parallel with said capacitor that they may be selectively inserted in the circuit so as to provide voltages across said resistors corresponding to the photographing limit, automatic control limit or hand-held camera photographing limit, respectively; and the power supply circuit of a plurality of indicating lamps or other indicating members which are switched over in response to the selection of said capacitor and said resistors is so controlled by the shutter operating circuit that said lamps or other indicating members are actuated when the operation of said operating circuit is changed over at the limit points in question.

Referring now to the drawing which illustrates a preferred embodiment of the present invention, the reference numeral 13 generally designates a solenoid which is associated with a camera shutter in a known manner whereby the energized solenoid 13 maintains the open camera shutter in its open position, the deenergization of the solenoid 13 releasing the shutter to return to its closed position. A timing network is provided for controlling the deenergization of the solenoid 13 to effect the closing of the shutter in response to the object lighting conditions and includes a photoconductor 1, a charging capacitor 2, and a voltage source or battery 3. The negative terminal of the battery 3 is connected to a negative line X and the positive terminal is connected through a main switch 17 to a positive line Y, and to the poles A, L, H and F, of a manually operable multipole switch 18 the arm of which is conected to line Y. The switch 18 has successive poles A, L, H and F, and is advantageously coupled to the shutter release button so that the switch 17 is closed upon the initial stage of depression of the shutter release button.

Ganged with the switch 18 and concurrently operated therewith are multipole switches 5, 9, 15 and 19 each of which includes an arm mechanically linked with the arm of the switch 18, and respective poles A, L, H and F, the corresponding poles A, L, H and F of the switches being concurrently engaged by the respective arms thereof. The arm of switch 19 is connected to line X, the poles H, L and A thereof are connnected to one end of the photoconductor 1, and the pole F thereof is connected through a resistor 20 to the other end of the photoconductor 1. It should be noted that when the pole F of the switch 19 is closed the resistor 20 is substituted for the photoconductor 1 to permit operation of the shutter by way of the solenoid 13 independently of the incident light. The resistor 20 may be variable to allow the manual adjustment of the shutter speed.

The junction point of resistor 20 and photoconductor 1 is connected through indicator control resistors 4 and 4' of different values to poles L and H respectively of switch 5, through capacitor 2 to poles A and F thereof, and through a resistor to the base of a PNP transistor 6. The arm of switch 5 is connected to positive line Y and a switch 21 is connected across the capacitor 2. The collector of transistor 6 is connected through a resistor to negative line X, and the emitter is connected to the base of an NPN transistor 10, through a resistor to negative line X, and the emitter of transistor 6 is connected through a resistor to the arm of switch 9.

The pole F of switch 9 is connected through a resistor 7 to negative line X and through the resistance element of a potentiometer 8 to positive line Y. The poles H, L and A of switch 9 are connected to the arm of the potentiometer 8. The potentiometer and resistor 7 function as a variable voltage divider for applying an adjustable bias to the transistor 6.

The emitter of the transistor 10 is connected to negative line X and the collector is connected through a resistor to positive line Y and through another resistor to the base of a PNP switching transistor 11. The emiter of transistor 11 is connected to line Y, and the collector is connected through a resistor to line X and through another resistor to the base of a PNP switching transistor 12. The collector of transistor 12 is connected through solenoid 13 to line X and the emitter is connected to line Y.

A low illumination limit indicator in the form of an electric bulb 16 is connected between the pole L of switch 15 and the collector of transistor 11 and a high illumination limit indicator bulb 14 is connected between pole H of switch 15 and the collector of transistor 12.

The fundamental exposure time controlling operation in a camera employing the above network is as follows: After the camera is set according to the exposure conditions of the film sensitivity and the diaphragm aperture, the shutter release button is depressed to open the shutter. As a result the main switch 17 is closed so that the circuit 16 energized by the battery 3 and due to the output transistor 12 being in a conductive condition the electromagnetic relay 13 so operates as to keep the shutter open.

In the photoconductive electric circuit there flows an electric current whose intensity is controlled by the photoconductor 1 whose resistance value varies in response to the object brightness. This photocurrent charges the capacitor 2 so that the voltage between the terminals thereof rises with time. This terminal voltage plus the bias voltage, which is controlled by potentiometer 8 whose resistance value is adjusted in accordance with the predetermined conditions such as the diaphragm aperture, film speed, etc., is impressed between the emitter and the base of the transistor 6. Accordingly, the base voltage of the transistor 6 rises as the voltage across the capacitor 2 rises, until the hitherto unconductive emitter-collector circuit of the transistor 6 becomes conductive, and the resulting flowing current is increased. The thus increased collector output voltage of the transistor 6 is applied to the base of the transistor 10 so that this transistor 10 is shifted from an unconductive to a conductive condition.

When the intensity of the current flowing through the transistor 10 reaches the predetermined value, the switching transistor 11 is shifted from an unconductive to a conductive condition, and the output transistor 12 is shifted from a conductive to an unconductive condition. The transistor 12 becoming unconductive deenergizes the electromagnetic relay 14, which has hitherto kept the shutter open by the power supply due to the conductiveness of the transistor 12, so that the shutter is closed. Thus, automatic exposure control is effected with the shutter opening controlling time constant determined by the time required for the predetermined rise of the voltage across the capacitor 2 charged by the photocurrent controlled by the photoconductor 1 in response to the object brightness.

In the above automatic exposure time controlling operation in accordance with the object brightness, it is necessary to determine whether the object brightness condition is within such range that permits the automatic exposure control due to the particular performance of the camera used. Such determination must be carried out with the diaphragm aperture taking its respective limit values, namely the maximum for the lowest illumination object and the minimum for the highest illumination object, and with consideration to the upper and the lower limits of the automatic exposure time control.

For the lowest illumination determination, first the diaphragm is set to the largest aperture. This effects the adjustment of the coupled variable resistor 8, thus placing the operating circuit under the maximum diaphragm aperture condition. When the switch 18 is brought into contact with the contact L, each of the switches 5, 9, 15 and 19 is brought into contact with the corresponding contact L. This operation may be carried out in a movement coupled to the initial portion of the shutter release button depressing movement, or by means of a separate lever arranged for this particular operation.

As a result of the above operation, the resistor 4 is inserted in the photoconductive electric circuit in place of the capacitor 2. This establishes the power supply circuit for the lowest illumination limit indicating lamp 16, the power source battery 3 being operative in this circuit prior to closure of the main switch 17, which closure is caused when the shutter release button is brought into its final depression movement stage and the shutter is actuated to open. The electromagnetic relay 13 now operates with the power supply from the battery 3. This operation, however, does not affect the camera mechanism, namely the shutter mechanism (keeping same open), since the shutter has not been opened. In other words, the following operation is performed within the circuit only and independent of the camera mechanism: A voltage, which is derived from division of the voltage of the battery 3 due to the resistance value of the photoconductor 1 in response to the object brightness and the resistance value of the resistor 4, is applied to the base of the transistor 6, whose operation is thus controlled by the resistance values of the photoconductor 1 and the resistor 4. Since the resistor 4 is of a fixed resistance value, actually the operation of the transistor 6 is controlled by the resistance value variation of the photoconductor 1, and accordingly by the object brightness variation sensed by the photoconductor 1.

When the object brightness is higher than the predetermined limit, the transistor 6 becomes conductive, and, as in the above described automatic control operation, through the operation of the transistor 10, the switching transistor 11 becomes conductive. This causes the power to be supplied from the battery 3 to the indicating lamp 16 and causes the same to be lit, the power supply circuit for the lamp 16 having been established by the aforementioned operation of the switch 15.

Thus, by the lit lamp 16 the user can confirm that the object brightness is over the predetermined level. The limit of the object brightness which causes the lamp 16 to be lit can be set by adjusting the resistance value of the resistor 4.

Thus, if the resistance value of the resistor 4 is so determined that said object brightness limit corresponds to the proper exposure low illumination photographing limit according to the characteristics of the camera (maximum aperture diaphragm and maximum exposure time), then while the lamp 16 is lit the object illumination is within the low illumination photographing limit so that proper exposure can be achieved by the automatic exposure time control. The unlit state of the lamp 16 indicates that the object brightness is out of the automatic proper exposure control range.

Determination as to whether a highly illuminated object is within the range which permits proper exposure photographing may be carried out as follows: The switch 15 is brought into contact with the contact H in a movement coupled to further shutter release button depressing movement stage or movement of a separate lever arranged for this particular purpose, so that the power supply circuit for the high illumination photographing limit indicating lamp 14 is established and the coupled switch 5 is so operated that the resistor 4' is inserted in the photoconductive electric circuit in series connection with the photoconductor 1. Due to the fixed resistance value of the resistor 4', the photoconductive electric circuit is in such a condition that the transistor 6 becomes conductive when the object brightness is higher than that which causes the camera to operate with the shortest exposure time. When the transistor 6 becomes conductive, the output transistor 12 becomes unconductive, as mentioned before. Accordingly, the lamp 14, which is connected to the battery 3 through this output transistor 12, is not lit. On the other hand, when the object brightness is within the above described limit, the transistor 6 remains unconductive so that the output transistor 12 is kept conductive and the lamp 14 lit. The lit lamp 14 indicates that the exposure condition is within the high illumination limit. Thus, after the user has confirmed that the exposure condition is within both high and low illumination limits, he can carry out a proper exposure photographing operation through automatic exposure time control.

The hand-held camera photographing limit can be indicated as follows: Suppose the hand-held camera photographing limit coincides with the low illumination photographing limit, the corresponding exposure time being 1/30 second. Then the lit lamp 16 indicates that the condition is within the hand-held camera photographing limit as well as the low illumination photographing limit, the resistor 4 being utilized for the two purposes. If these limits differ from each other, the resistor 4 may be replaced by two resistors corresponding to those limits respectively, and corresponding two lamps or one common lamp may be lit through control of the photocurrent circuit by these resistors. Observation of the indicating lamps will be facilitated by providing lamps of different colors.

As mentioned above, according to the present invention, by inserting suitable resistors respectively corresponding to different exposure time limits in the photoconductive electric circuit, the limits can be determined by indicating lamps which are lit under the control of a specific circuit which constitutes a part of the automatic exposure time control circuit. Since this arrangement is purely electric, it is highly reliable and the necessary operation can be carried out in a stable manner. Accordingly, greater effect and advantage are obtained in actual use of the automatic exposure time control arrangement.

In addition to the non-lit lamp indication, it is very advantageous in practice to prevent the shutter release button depressing movement at the same time by means of an electromagnetic relay, or the like.

While there has been described and illustrated a preferred embodiment of the present invention, it is apparent that numerous alterations, omissions and additions may be made without departing from the spirit thereof.

What is claimed is:

1. In an automatic exposure camera including a solenoid controlled shutter, a timing network including a photoconductor and a capacitor, first means for connecting said timing network to a voltage source, second means responsive to a predetermined voltage across said capacitor for controlling said solenoid, an electrically energized first indicating device, a plurality of resistors, third means for connecting selected one of said plurality of resistors in series with said photoconductor across a voltage source, and fourth means responsive to a predetermined voltage across said selected resistor for controlling the energization of said indicating device.

2. The automatic exposure camera of claim 1 wherein said third means is adapted to alternatively connect said capacitor and said selected resistor in series with said photoconductor across said voltage source.

3. The automatic exposure camera of claim 2 wherein said third means is a first switch, and comprising a second switch connected in series with said indicating device and coupled to said first switch for simultaneous operation therewith between respective opened and closed positions.

4. The automatic exposure camera of claim 1 wherein said indicating device is an electric bulb.

5. The automatic exposure camera of claim 1 comprising a plurality of said indicating devices, said third means comprising a first multiple switch, and including a second multiple switch connected in series with each of said indicating devices and coupled to said first switch for simultaneous operation therewith for concurrently closing said switches to alternative pairs of said selected resistors and said indicating devices.

6. The automatic exposure camera of claim 1 including fifth means for adjusting said predetermined voltage.

7. The automatic exposure camera of claim 1 wherein said fourth means comprises a transistor switch network having a controlled output connected in series with said solenoid across a voltage source and a control input, and including a first switch for alternatively connecting said capacitor and said selected resistor across said control input.

8. The automatic exposure camera of claim 7 wherein said transistor switch network comprises a first transistor including a base electrode defining said control input and a second transistor having output electrodes defining said output, the output of said first transistor being coupled to the input of second transistor.

9. The automatic exposure camera of claim 1 including a second electrically energized indicating device, said second and fourth means including a solid state switch including first, second and third transistors, the input to said second transistor being coupled to the output of said first transistor and the input of said third transistor being coupled to the output of said second transistor whereby second and third transistors are alternatively conducting and nonconducting, said first and third means including a first switch for selectively coupling said capacitor and said selected ones of said plurality of resistors to the input of said first transistor, and switch means simultaneously operable with said first switch for alternatively selectively connecting to a voltage source said first and second indicating devices through said second and third transistors respectively and said solenoid through said third transistor.

10. The automatic exposure camera of claim 9 including means for supplying a variable bias across the input to said first transistor.

11. In an automatic exposure camera including a solenoid controlled shutter, a timing network including a photoconductor and a capacitor, first means for connecting said timing network to a voltage source, second means responsive to a predetermined voltage across said capacitor for controlling said solenoid, an electrically energized first indicating device, a first resistor, a third means for selectively connecting said resistor in series with said photoconductor across a voltage source, fourth means responsive to a predetermined voltage across said first resistor for controlling the energization of said indicating device, and fifth means for adjusting said predetermined voltage.

References Cited

UNITED STATES PATENTS 3,397,629   8/1968   Mori et al.

JOHN M. HORAN, Primary Examiner

J. F. PETERS, Jr., Assistant Examiner

U.S. Cl. X.R.

95—53; 317—124